Dec. 19, 1950
J. C. ALBRIGHT
2,534,497
MOTION TRANSMITTING DEVICE
Filed June 12, 1947
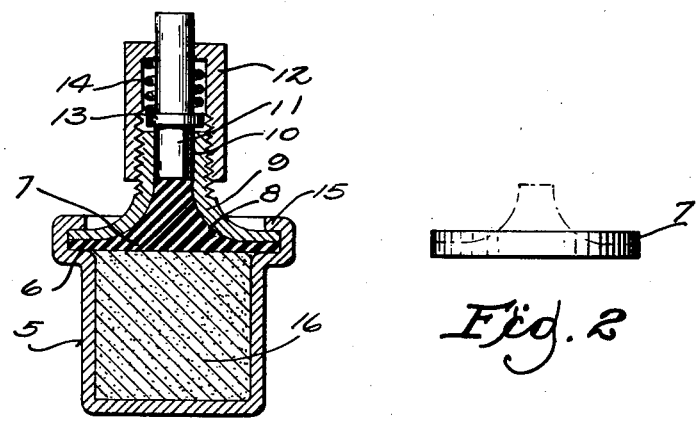
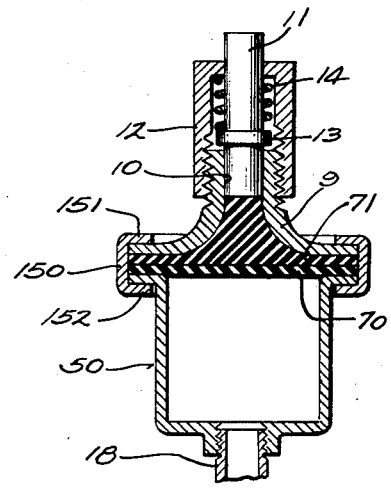
INVENTOR
JOHN C. ALBRIGHT
BY
Wheeler, Wheeler + Wheeler
ATTORNEYS Patented Dec. 19, 1950

2,534,497

UNITED STATES PATENT OFFICE 2,534,497

MOTION TRANSMITTING DEVICE

John C. Albright, Chicago, Ill., assignor, by mesne assignments, to himself and William J. Adams, Chicago, Ill.

Application June 12, 1947, Serial No. 754,093

12 Claims. (Cl. 137—157)

This invention relates to improvements in devices for transmitting a small amount of movement in a body of large cross sectional area into a relatively larger amount of movement in a body of smaller cross sectional area.

The invention is concerned particularly with the type of thermostat in which the pressure of a substantial body of thermally expansible material is concentrated on a plunger of relatively small cross sectional area to produce a relatively large axial response of the plunger commensurate with the relatively larger mass of the body which is developing pressure. A device of this general type is disclosed in Patent 432,182 of July 15, 1890. The pressure developed by the expansible body and communicated to the plunger may be used for any desired purpose, as to open or close a switch or valve, or to actuate any other part.

It is the purpose of the present invention to preclude leakage of the expansible material outwardly along the bearing surface of the plunger while, at the same time, avoiding the destruction which usually follows when a diaphragm is bent. The ordinary diaphragm subject to the pressure of a large mass of material on one face and engaged on its opposite face only by the plunger would obviously be required, in effecting plunger movement, to become attenuated and cupped to enter the plunger bore in propelling the plunger outwardly therein. According to the present invention, the expansible material is wholly confined by a diaphragm of a new type in which motion is effected by deformation rather than by flexing of the diaphragm. The material of the diaphragm is soft enough so that it actually flows and the form of the chamber is such that it tapers curvilinearly at the point where the diaphragm is confined therein, thus avoiding any sharp corners across which the diaphragm may be bent or cut.

It is also the object of the invention to use my improved principle in pressurestats and the like irrespective of the expansion of any thermally responsive material contained within the device.

In the drawings:

Fig. 1 is an axial section through the device embodying the invention.

Fig. 2 is a detail view in side elevation of a diaphragm used in the device of Fig. 1, the deformed shape thereof being shown in dotted lines.

Fig. 3 is a view in axial section through a modified embodiment of the invention.

The cup-shaped casing 5 of Fig. 1 is provided with a shoulder 6 for a closure partition comprising a combined diaphragm and motion transmitting body 7. This body is confined within the curvilinearly tapered throat portion 8 of a fitting at 9 which has a cylindrical bore at 10 for plunger 11 and is externally threaded to receive the pressure adjusting cap 12.

The plunger 11 carries an annular flange 13 against which seats a compression spring 14 confined within cap 12. The plunger projects axially through the cap and is available for any desired work upon any desired mechanism.

The body 7 is prefabricated in the form of a disk such as is shown in Fig. 2. It may comprise natural or synthetic rubber or any other similarly deformable material. While it is preferred that the material be elastic, elasticity is not essential because of the spring pressure exerted by spring 14 on plunger 11, tending to restore the plunger and the material to the relative positions shown in Fig. 1. Consequently, silicons and various plastics having little or no elasticity are usable. Superior results are obtainable, however, when the material used is such as to tend to restore itself to its original form.

In the device shown in Fig. 1, the assembly is maintained by coupling collar which may take the form of a flange 15 on the cup or container 5 inwardly over the margin of the throat portion 8 of fitting 9. Fig. 3 shows a different construction as will hereinafter be described and it will be obvious that any desired means for holding the throat fitting and container together may be employed. It will also be apparent that a wide variety of structures may be used for subjecting the plunger to spring pressure, with or without such spring adjustment as is provided by the cap 12. Since the present invention is not concerned with these details, the illustrated construction is solely by way of exemplification.

The cup 5 is completely filled with a material 16 whose coefficient of expansion, when heated, will be greater than that of the cup so as to produce a net expansive pressure as the temperature is increased. A variety of materials known to the art may be used for this purpose. One of them is ordinary mercury. Another is beeswax. Another is a mixture of beeswax, latex and aluminum dust. However, the best material for the purpose that I have yet found has great advantage because it is neither a liquid nor a solid but a paste at atmospheric temperature, giving tremendous expansion when heated, and yet flowing readily in a contracting direction when cooled. This paste comprises:

60% $C_6H_4Cl_2$ (paradichlorobenzene)
6.5% raw cocoanut oil
6.5% raw castor oil
27% commercial beeswax The ingredients are heated for five minutes to approximately 174° C. to dissolve them together. When cool, they may be filled into the cup at approximately the consistency of cold cream. Alcohol or other solvent may be added as a thinner, if desired.

The paradichlorobenzene in the above composition appears to be dissolved in the beeswax which is thinned by the cocoanut oil and the castor oil, the relative proportions of the oils regulating viscosity. In a thermostat of the kind herein disclosed, the response is a very steep curve up to 100° F. and is almost rectilinear above 100° F. Not only is the response of this paste greater than the response of any other material tested for any given range of temperatures, but the range of temperatures over which expansion continues substantially rectilinearly is almost double the range of any other material known to me.

In the form in which the diaphragm is prefabricated as shown in Fig. 2, it is simply a thick wafer which may have perfectly flat and parallel top and bottom faces. The precise form of this wafer is immaterial because, under the pressure exerted in clamping the fitting 9 to the cup 5, the diaphragm is so deformed that its side margins are reduced materially in thickness. The material thus displaced is caused to flow upwardly into the curvilinearly tapering throat 8 of fitting 9 until it reaches substantially to the point where such throat merges with the cylindrical bearing 10 in which the plunger 11 is reciprocable.

The resulting member 7, in the assembled device, has the nature of a diaphragm in that it extends completely across the cup 5, being compressed against the shoulder 6 thereof, and completely seals and encloses the material at 16. Yet the member 7 cannot flex like a diaphragm in response to the expansion of such material. As the material expands, the diaphragm can be displaced only by bodily deformation thereof and a flowing of its substance upwardly into the bore 10, where it urges the plunger outwardly in such bore. The flowing of the deformable diaphragm does not subject the material of the diaphragm to any shearing stresses or wear, since the throat is curvilinearly tapered and smooth and presents no sharp or abrasive edges. When the temperature increase which is responsible for the expansion of the substance 16 is relieved, the diaphragm flows back to its original form as shown in Fig. 1. If the device were to be disassembled, the diaphragm would resume the form in which it is illustrated in Fig. 2.

Fig. 3 indicates three changes, any of which may be adopted separately in the device of Fig. 1.

In the first place, the container 50 merely constitutes a chamber to which fluid under pressure may be communicated from any boiler or other source through pipe 18. This makes the device function as a socalled pressurestat instead of a thermostat. It will be understood that the device of Fig. 1 may also function as a pressurestat by omitting the material 16 and providing a coupling into the container 5 as suggested in Fig. 3.

Secondly, I have provided in Fig. 3 a separate diaphragm 70 and motion communicating deformable body 71 which may be, but need not be, of the same material as the diaphragm. There is no reason to make the diaphragm and the motion transmitting body of separately prefabricated parts except to demonstrate the fact that there are two separate functions to be performed, the first being the function of a diaphragm, and the second being the function of motion transmission with increased displacement of the plunger in accordance with the difference in diameter between the plunger bore and the cross section of the container 5. Whether for purposes of a pressurestat or a thermostat or other device, the component elements 70 and 71 may be interchanged with the element 7, as shown in Fig. 1, either the integral or the composite form of diaphragm being usable in any one of these constructions.

Thirdly, I have shown the pressure cup 50 and the coupling member 9 connected in Fig. 3 by means of a separate coupling collar 150 having flanges 151 and 152 respectively engaged with the fitting 9 and the flanged upper end of cup 50. As above indicated, this mode of connection is applicable, as is any one of several other connecting means, not only to the device of Fig. 3 but to that of Fig. 1.

In all embodiments of the invention, the pressure responsive device may be regarded as comprising a chamber divided by a deformable diaphragm into two compartments, one of which is of materially greater cross section than the other, the diaphragm having a relatively large area exposed to the larger compartment and a relatively small area exposed to the smaller compartment and the wall of the chamber between the opposite faces of the diaphragm being tapered, preferably curvilinearly, so that displacement of the diaphragm will occur by the flowing of the material thereof into the smaller compartment without bending of, or injury to, the diaphragm. The larger chamber comprises a pressure chamber and the smaller preferably comprises a cylinder in which a plunger is operable by deformation of the diaphragm. The diaphragm is preferably elastic, tending to return by its own resilience to its original form upon relief of the pressure differential as between the larger chamber and the smaller. Regardless of elasticity, however, the form of the diaphragm may be restored by the spring pressure exerted on the plunger and transmitted therethrough to the diaphragm.

In each of the several embodiments, the diaphragm includes a wafer forced under pressure to conform to the shape of the tapered throat which forms the wall surface between the larger and smaller chambers. As explained, it is broadly immaterial, whether the deformable motion transmitting member occupying the throat is a part of, or separate from, the diaphragm proper.

I claim:

1. In a pressure responsive device, a chamber having a pressure compartment of relatively large diameter and a cylinder compartment of materially smaller diameter, and a tapered throat providing a uniformly curving wall surface comprising an end of the pressure compartment and leading from the larger compartment to the smaller compartment with progressively changing direction and a deformable body within said throat and flowable into said cylinder compartment in response to increase of pressure in said pressure compartment relative to that in said cylinder compartment.

2. In a pressure responsive device, a chamber having a pressure compartment of relatively large diameter and a cylinder compartment of materially smaller diameter, and a tapered throat providing a wall surface comprising an end of the pressure surface and leading from the larger compartment to the smaller compartment with progressively changing direction, together with a diaphragm transversely spanning the larger compartment and marginally connected thereto as a complete closure between the larger and smaller compartments, and a deformable body substantially filling the space between said diaphragm and the cylinder compartment and the throat and adapted to flow into the cylinder compartment in response to increase of pressure in the pressure compartment relative to that in said cylinder compartment.

3. The sub-combination specified in claim 2 in which the diaphragm and body are integral.

4. The sub-combination specified in claim 2 in which the diaphragm and body constitute separately prefabricated elements.

5. The sub-combination specified in claim 2 in which at least the body comprises a resiliently elastic material.

6. A device of the character described comprising the combination with a pressure cup, of a throat fitting provided with a coupling in connection with the cup and including a cylinder and a tapered throat leading from said coupling to said cylinder, said throat being substantially circular in cross section and its taper being convexly curvilinear in axial section, a flexible partition marginally engaged between the cup and fitting to constitute a closure for the cup, said partition comprising a diaphragm and a deformable body substantially filling the space in the throat between the diaphragm and the cylinder together with a plunger reciprocable in the cylinder and engaging said body, said body being adapted to flow into the cylinder upon the flexing of the diaphragm in response to increase of pressure in said cup relative to the pressure on said plunger, whereby to displace said plunger.

7. The combination set forth in claim 6 in which the diaphragm and body comprising the partition are a single integral mass of material.

8. The combination set forth in claim 6 in which the diaphragm and deformable body comprising the partition constitute separate prefabricated elements.

9. The combination set forth in claim 6 in which the diaphragm and deformable body comprising the partition constitute separate prefabricated elements of elastically resilient materials.

10. In a device of the character described, the combination with a pressure cup having a marginal seat, of a partition closing said cup and engaged with said seat, said partition comprising a flexible diaphragm portion and a deformable body portion, a throat fitting in clamping engagement with said partition about said seat, a clamping collar connecting cup and fitting under clamping pressure upon said partition, said fitting having a tapering throat curving in axial section from said seat and substantially filled by said body and a cylinder with which said throat communicates, and a plunger in the cylinder engaging said body to receive motion therefrom and provided with a spring biasing said plunger toward said partition against the pressure of said body.

11. The combination set forth in claim 10 in which said body comprises an elastically resilient mass adapted to resume its original form upon relief of pressure in said cup.

12. The combination set forth in claim 10 in further combination with a member provided with a seat for said spring and with an adjustable connection to said fitting whereby to vary the bias of said spring upon said plunger, said plunger also having a seat for said spring.

JOHN C. ALBRIGHT.

REFERENCES CITED

The following references are of record in the file of this patent:

UNITED STATES PATENTS

| Number | Name | Date |
| --- | --- | --- |
| 1,804,599 | Edel | May 12, 1931 |
| 2,158,854 | Drake | May 16, 1939 |
| 2,208,149 | Vernet | July 16, 1940 |
| 2,259,846 | Vernet | Oct. 21, 1941 |
| 2,354,958 | Loweke | Aug. 1, 1944 |
| 2,368,181 | Vernet | Jan. 30, 1945 |

FOREIGN PATENTS

| Number | Country | Date |
| --- | --- | --- |
| 118,999 | Switzerland | of 1927 |